(12) United States Patent
Parker et al.

(10) Patent No.: US 9,213,948 B2
(45) Date of Patent: Dec. 15, 2015

(54) SYSTEM AND METHOD FOR PROCESS DATA MANAGEMENT AND ORGANIZATION

(75) Inventors: Darrin Thomas Parker, Toronto (CA); John Edward Ely, Toronto (CA)

(73) Assignee: SALESTREE INC., Toronto (CA)

( * ) Notice: Subject to any disclaimer, the term of this patent is extended or adjusted under 35 U.S.C. 154(b) by 814 days.

(21) Appl. No.: 13/458,078

(22) Filed: Apr. 27, 2012

(65) Prior Publication Data

US 2013/0290417 A1 Oct. 31, 2013

(51) Int. Cl.
*G06F 15/16* (2006.01)
*G06Q 10/00* (2012.01)

(52) U.S. Cl.
CPC .................................. *G06Q 10/00* (2013.01)

(58) Field of Classification Search
CPC ... H04L 29/06; H04L 29/08072; G06Q 10/10
See application file for complete search history.

(56) References Cited

U.S. PATENT DOCUMENTS

| | | | |
|---|---|---|---|
| 2004/0153389 A1* | 8/2004 | Lortscher, Jr. | 705/36 |
| 2010/0169859 A1* | 7/2010 | Bergman et al. | 717/102 |
| 2012/0007882 A1* | 1/2012 | Sakurai et al. | 345/619 |
| 2012/0041921 A1* | 2/2012 | Canaday et al. | 707/607 |
| 2012/0046966 A1* | 2/2012 | Chang et al. | 705/3 |
| 2013/0191315 A1* | 7/2013 | Soldacki | 706/46 |

* cited by examiner

*Primary Examiner* — Philip Chea
*Assistant Examiner* — Van Kim T Nguyen
(74) *Attorney, Agent, or Firm* — Perry + Currier Inc.

(57) ABSTRACT

A system and method for process data management and organization is provided. An embodiment includes an apparatus for updating a process. The apparatus includes a storage device capable of storing a prospect database. The apparatus is operable to receive a prospect record from the stored prospect database. Once the prospect record is obtained, the apparatus can determine a process stage associated with the prospect record, and identify an available action associated with the stage which can be received from the storage device. The apparatus is operable to trigger the performance of the determined action and receive resulting data. Accordingly, the stage associated with the prospect record can be updated by the apparatus.

18 Claims, 11 Drawing Sheets

SYSTEM AND METHOD FOR PROCESS DATA MANAGEMENT AND ORGANIZATION

FIELD OF INVENTION

The present invention relates generally to data management, and more particularly to a system and method for process management and data organization.

BACKGROUND

Various forms of processes exist including sales processes (http://en.wikipedia.org/wiki/Sales_process), workflow based processes, and others which are used in variety of disciplines including operations, planning and flow-control. As different process components are adapted for computerized and network based operations, automated process control and management systems, including those for the collection, processing and updating of process data are needed.

SUMMARY

It is an object to provide a novel system and method for process data management and organization that obviates and mitigates at least one of the above-identified disadvantages of the prior art.

According to an aspect a method of updating a process at a computer having at least one processing unit is provided. The method comprises the steps of:
  receiving, in one or more processing units, a prospect record;
  determining, using one or more processing units, a stage associated with the prospect record;
  determining, using one or more processing units, an available action associated with the stage;
  triggering a performance of the available action;
  receiving, in one or more processing units, results data based on the performance of the available action; and
  updating, based on results data and using one or more processing units, the stage associated with said prospect record.

The method can further comprise, using one or more processing units, updating a graphical object based on the updated stage. The graphical object can include a portion associated with the stage. Moreover, the stage can be one of a Nutrient, Root, Trunk, Branch, Bud and Fruit. The graphical object can be a representation of a tree. The graphical object can also include an indicia of the prospect record. The indicia of the prospect record can vary in shape. The indicia of the prospect record can also vary in size.

The updating of the graphical object can further comprise updating the indicia of the prospect record based on the updated stage. A stage can be associated with one or more of an element, resource, measure or input. Moreover, a portion of the graphical object can vary in shape or size based on one or more of an element, resource, measure and input. The updated graphical object can be transmitted to a client terminal. The updated graphical object can also be displayed.

Another aspect provides an apparatus for updating a process. The apparatus typically comprises a storage device for storing a prospect database. The apparatus typically also comprise one or more processing units connected to the storage device. The one or more processing units are operable for:
  receiving a prospect record from the prospect database;
  determining a stage associated with the prospect record;
  determining an available action associated with the stage;
  triggering a performance of the available action;
  receiving results data based on said performance; and
  updating, based on the results data, said stage associated with said prospect record.

The one or more processing units can also be further operable to update, based on the results data, the stage associated with the prospect record. The apparatus can also comprise an output device for displaying the updated graphical object. The apparatus can further comprise a network interface for transmitting the updated graphical object to a client terminal.

DETAILED DESCRIPTION

Figure 1:
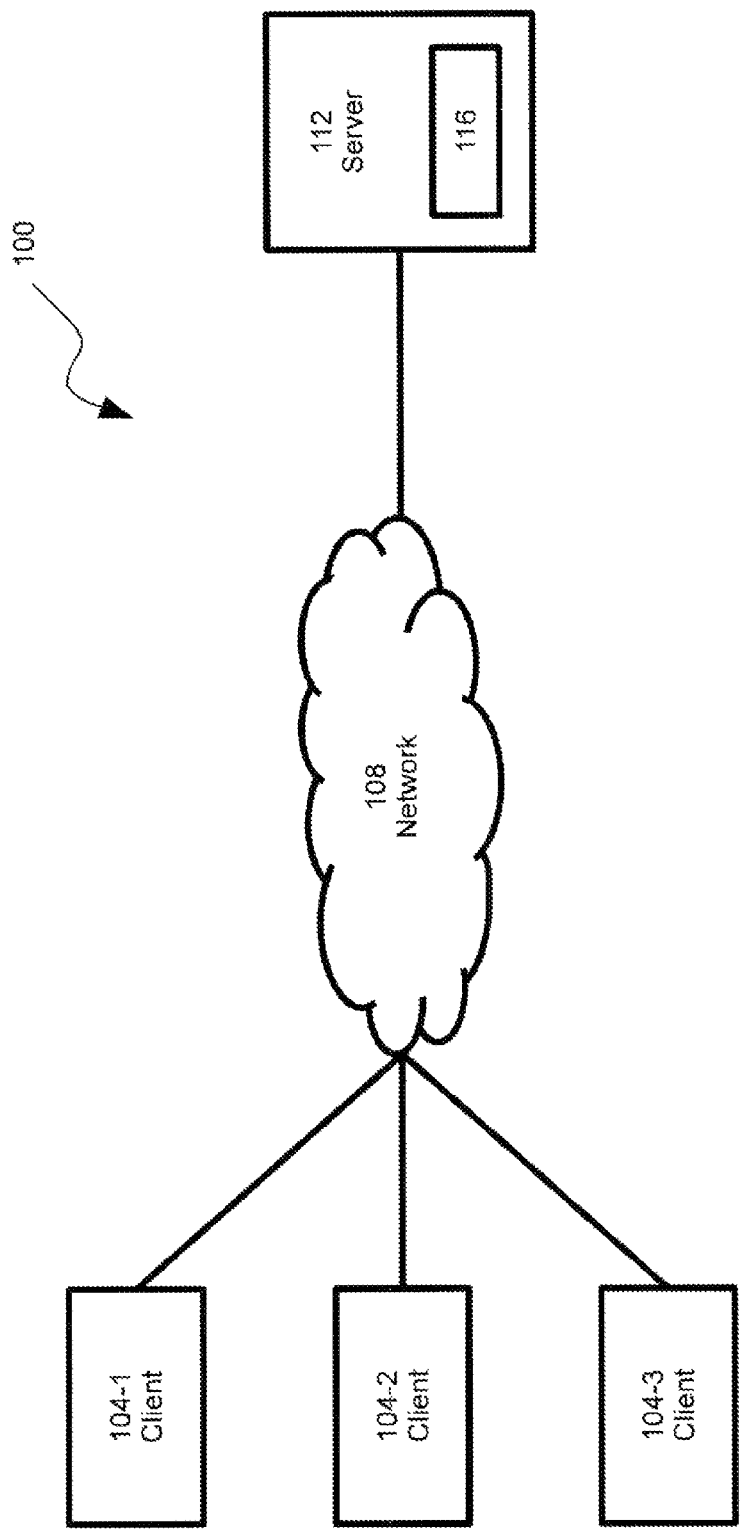
FIG. 1 shows a block diagram of an embodiment of a system for process data management.

FIG. 1 shows a diagram of a system 100 for organizing process data. At least one client terminal (client terminals 104-1, 104-2 and 104-3) is connected, via network 108, to server 112. Collectively, client terminals 104-1, 104-2 and 104-3 are referred to as client terminals 104, and generically as client terminal 104. This nomenclature is used elsewhere herein.

Client terminals 104 can be based on any suitable computing environment, and the type is not particularly limited so long as each client terminal 104 is capable of receiving data from server 112, displaying data in graphical form and transmitting data to server 112. In a present embodiment, client terminals 104 are configured to at least execute a web browser that can interact with the web service hosted by server 112.

Client terminals 104 can be based on any type of client computing environment, such as a desktop computer, a laptop computer, a netbook, a tablet, a smart phone, a PDA, other mobile computing device or any other platform suitable for graphical display that is known in the art. Each client terminal 104 includes at least one processor connected to a non-transitory computer readable storage medium such as a memory. Memory can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. In one embodiment, memory includes both a non-volatile memory for persistent storage computer-readable instructions and other data, and a non-volatile memory for short-term storage of such computer-readable instructions and other data during the execution of the computer-readable instructions. Other types of computer readable storage medium external to client terminal 104 are also contemplated, such as secure digital (SD) cards and variants thereof. Other examples of external computer readable storage media include compact discs (CD-ROM, CD-RW) and digital video discs (DVD).

Client terminal 104 can also include one or more input devices connected to at least one processor. Such input devices are configured to receive input and provide data representative of such input to the processor. Input devices can include, for example, a keypad and a pointing device. A pointing device can be implemented as a computer mouse, track ball, track wheel, touchscreen or any suitable combination thereof. In some examples, client terminal 104 can include additional input devices in the form of one or more additional buttons, light sensors, microphones and the like. More generally, any suitable combination of the above-mentioned input devices can be incorporated into client terminal 104.

Client terminal 104 further includes one or more output devices. The output devices of client terminal 104 can include a display. When the pointing device includes a touchscreen, the touchscreen can be integrated with the display. Each client terminal 104 also includes a communications interface connected to the processor. The communications interface allows client terminal 104 to communicate with other computing devices, for example via network 108. The communications interface is therefore selected for compatibility with network 108.

Network 108 can comprise any network capable of linking server 112 with client terminals 104 and can include any suitable combination of wired and/or wireless networks, including but not limited to a Wide Area Network (WAN) such as the Internet, a Local Area Network (LAN), cell phone networks, WiFi networks, WiMax networks and the like.

In general terms, server 112 can comprise any platform capable of processing, transmitting, receiving, and storing data. In a present embodiment, server 112 is a Web server configured for database management. Server 112 can be based on any desired server-type computing environment including appropriate configurations of one or more central processing units (CPUs) configured to control and interact with non-transitory computer readable media in the form of computer memory or a storage device. Computer memory or storage device can include volatile memory such as Random Access Memory (RAM), and non-volatile memory such as hard disk drives or FLASH drives, or a Redundant Array of Inexpensive Disks (RAID) or cloud-based storage. Server 112 also includes one or more network interfaces, to connect to network 108 or client terminal 104. Server 112 can also be configured to include input devices such as a keyboard or pointing device or output devices such as a monitor or a display or any of or all of them, to permit local interaction. Other types of hardware configurations for server 112 are contemplated. For example, server 112 can also be implemented as part of a cloud-based computing solution, whereby the functionality of server 112 is implemented as one or more virtual machines executing at a single data center or in a mirrored form across a plurality of data centers. The software aspect of the computing environment of server 112 can also include remote access capabilities in lieu of, or in addition to, any local input devices or local output devices. Any desired or suitable operating system can be used in the computing environment of server 112. The computing environment can be accordingly configured with appropriate operating systems and applications to effect the functionality discussed herein. Those of skill in the art will now recognize that server 112 need not necessarily be implemented as a stand-alone device and can be integrated as part of a multi-purpose server or implemented entirely in software, for example a virtual machine. In a present embodiment, server 112 is connected to a storage device 116, such as a hard-disk drive, solid state drive, or any other type and arrangement of non-volatile storage device.

Figure 2:
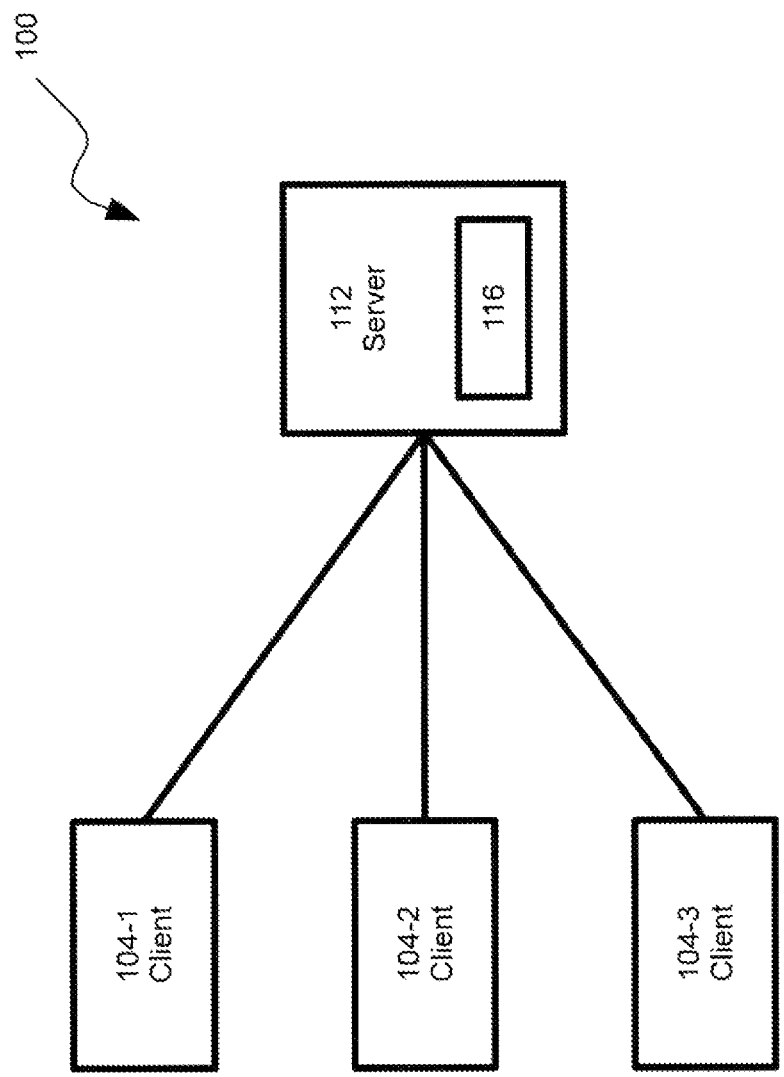
FIG. 2 shows a block diagram of another embodiment of a system for process data management.

In another embodiment of system 100, as shown in FIG. 2, client terminals 104 may connect directly to server 112.

Figure 3:
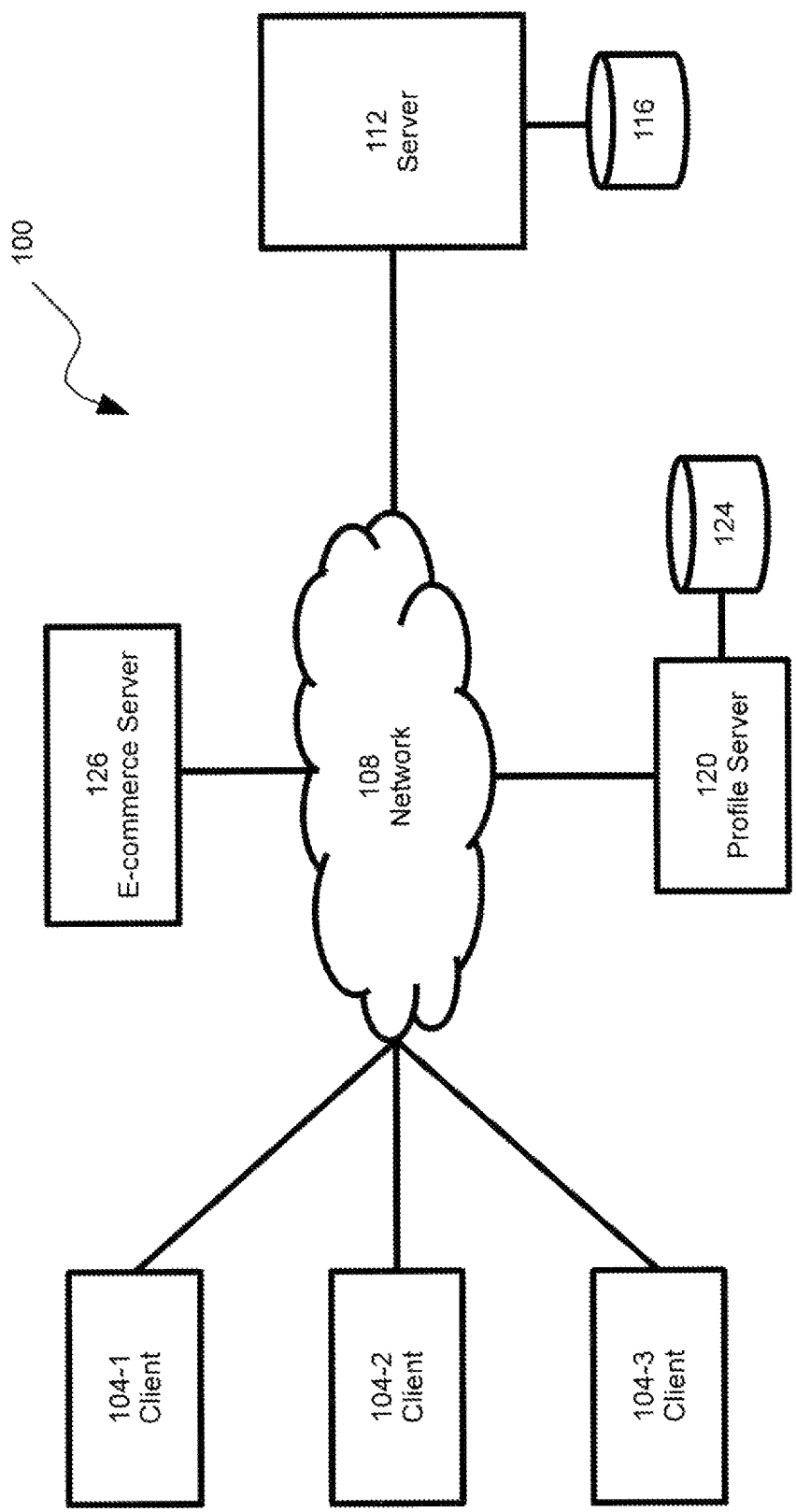
FIG. 3 shows a block diagram of another embodiment of a system for process data management, including a profile server and an e-commerce server.

In a further embodiment, as shown in FIG. 3, system 100 can include a profile server 120. In the present embodiment, profile server 120 includes a profile database 124. Broadly speaking, profile database 124 is any database containing information about prospect customers or clients of a business. Profile database 124 can include, for example, proprietary data maintained by a business such as a prospect customer list, sales tracking information or contact list. Profile database 124 can also include prospect customer or client data obtained from one or more third party services, such as Facebook™, Google™, Twitter™ or LinkedIn™, and other networked data sources, including call center servers and web page servers. In one variation, Profile server 120 obtains data from third party services by functioning as an aggregator, accessing the respective service's access points. Alternatively, Profile server 120 can obtain data from third party services and other networked sources by accessing aggregator services that aggregate information from the third party services as well as from other networked information sources. Profile server 120 is typically linked to the third party access points or aggregators, or a combination thereof, through network 108. Other methods of connecting to third party services and aggregators are contemplated such as through proxies and gateways are considered within scope.

It should now be apparent to the reader that in other variations of system 100, profile server 120 can be co-located with Server 112, and have a direct link to server 112. Alternatively, profile server 120 can be connected to server 112 through a network different than network 108 thus allowing the communication between the two servers to bypass network 108. In other variations, profile database 124 can be located on server 112, thus allowing server 112 to perform the functionality of profile server 120.

Continuing with FIG. 3, an E-commerce Server 126 is also shown. E-commerce server 126 is linked to server 112 through network 108, although other variations in connectivity, such as links through a network separate from 108 is contemplated and are within scope. E-commerce server 126 typically hosts an e-commerce site such as an on-line store, and typically has access to inventory and customer databases. Moreover, E-commerce server 126 can generally perform the functions of obtaining customer information, payment information, processing payment and preparing shipment information. E-commerce server 126 may link with one or more other servers or computers, such as a warehouse server, a credit card processing server, and others to perform one or more of its functions.

Variations in the implementation of system 100 will now occur to one of skill in the art, all of which are contemplated as possible implementations of system 100 and are considered within scope. For example, each client 104 can be connected directly to storage device 116, accessing and operating upon the contents of the storage device 116 directly, without an intermediary server 112.

Figure 4:
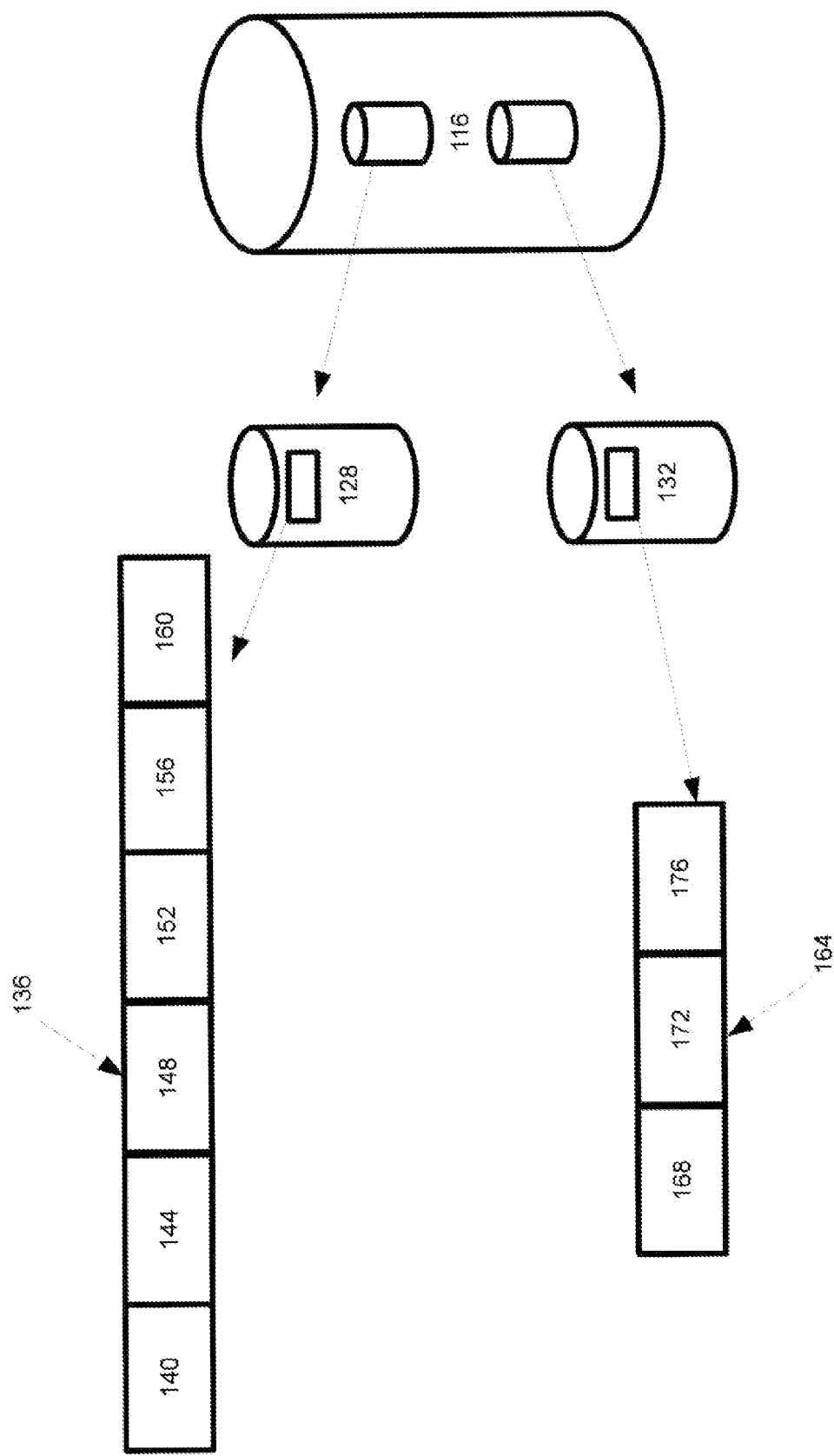
FIG. 4 shows a block diagram of another embodiment of a system for process data management.

FIG. 4 shows a simplified representation of the kinds of databases and tables that can be stored at storage device 116 and operated upon by server 112 to perform process management. As shown in FIG. 4, in this embodiment, storage device 116 contains two separate databases. A process database 128 contains the stages of a process. A prospect database 132 contains individual prospect customers or classes of customers populating various stages of the process.

FIG. 4 further shows a process record 136 from the process database 128, which is in the form of a row. The process record 136 includes an entry "record identifier" 140 which is an entry for identifying a process record 136. The process record 136 also includes an entry "current stage" 144, which identifies the current process stage being processed. Process record 136 further includes an entry "inputs" 148 which is a list of inputs that can be used in processing the current stage as identified by the entry current process stage 144 of the process record 136. Process record 136 additionally includes an entry "actions" 152 and an entry "next stage" 156. Actions 152 entry identifies possible actions that can be performed at that current stage. Next stage 156 entry identifies the stages that can be reached next from the current stage of the process record 136. Process record 136 moreover includes an entry "measures" 160 for identifying the measurements that can be computed to provide information regarding the process record 136's current stage.

FIG. 4 additionally shows a prospect record 164 from the prospect database 132, which is also in the form of a row. A prospect record 164 includes the entry "record identifier" 168 for identifying a prospect record 164. Prospect record 136 also includes an entry "prospect name" 172 and an entry "current prospect stage" 176. Prospect name 172 entry identifies the name of the prospect being stored in the prospect record 164, and the prospect stage 176 entry identifies the current process stage the prospect is at. In this example, the current prospect stage 176 entry corresponds to the current process stage 144 entry of the process database 128. Namely, values associated with the prospect stage 176 entry are based on one of the values that exist in a process record 136 of process database 128.

Process database 128 and prospect database 132 can be implemented using a variety of constructs including linked lists, arrays, object oriented containers, relational or flat databases, or recursive structures amongst others. Moreover, although in this embodiment, the data on storage device 116 has been stored in two different databases, in other variations, the data may be stored in fewer or more tables, databases or other structures organized in a different manner. Variations in the implementation of process database 128, prospect database 132, as well as the organization of the information on storage device 116 will now occur to one of skill in the art, all of which are contemplated as possible implementations of data storage on device 116 and are considered within scope.

Referring now to Table 1, an example sales process is shown. Column one is the name of a process stage. Column two provides a brief description of the stage. Column three provides characteristics of the stage. Column 4 defines possible next stages.

TABLE 1

An Example Sales Process

| Process Stage | Description | Characteristic | Next Stage |
| --- | --- | --- | --- |
| "Nutrient" | Unknown prospect | No data to identify prospect | Root |
| "Root" | Broadly known prospects | Identifying data for prospect available | Trunk |
| "Trunk" | Prospects actively interested | Prospect has engaged the system | Branch |
| "Branch" | Prospects directly engaged | Prospect data relating to products are collected | Bud, Fruit, Nutrient |
| "Bud" | First time customers | Prospect engaged in business relationship | Fruit, Root |
| "Fruit" | Repeat Customers | Prospect engaged in additional business relationships | Root |

Continuing to refer to Table 1, the first process stage is the "Nutrient" and corresponds to the stage where the actions will be directed at the general market as shown in the first row. At this stage of the sales process, the prospect customers are unknown. As an illustration, in an example where the process is being applied to e-commerce server 126 of FIG. 3, and the e-commerce server 126 is performing the function of an online mobile-phone retailer, the "Nutrient" stage would correspond to the universe of potential phone customers. Additionally, referring to FIG. 3 and FIG. 4, there would typically be no records for the prospects in the profile database 124, prospect database 132, and other relevant databases of system 100. The goal for this stage is to obtain prospect contact information and related data for the relevant databases of system 100.

A precursor to collecting prospect customer information is advertising. Continuing with the online-mobile phone retailer illustration discussed above, and referring to FIG. 3 and FIG. 4, for e-commerce server 126, advertising can include posting sales and marketing information, through the use of profile server 120, to third party services such as Facebook™ and Twitter™, as well as other information providers such as web content providers. Advertising can also include providing online advertising postings through online advertising services such as Google Adwords™ There are various other forms of advertising, all of which are contemplated herein, and are considered within the scope.

There are various methods through which an unknown prospect customer's data can be aggregated into profile database 124. For example, the prospect profiles may have been obtained by third party services as a result of a web site engagement or a call center contact with the customer, and aggregated by profile server 120. Yet in other examples, the E-commerce server 126 may have obtained visitor data as part of its function, and transferred that data to profile server 120. At this point, variations in methods of data aggregation by system 100 will now occur to one of skill in the art, all of which are contemplated as possible implementations of profile server 120 functionality and are considered within scope.

The next stage of the example sales process is "Root" and corresponds to the stage where the sales actions are directed at known prospect customers. Continuing with the online-mobile phone retailer illustration discussed above, and referring to FIG. 3 and FIG. 4, this stage is generally directed at actions involving prospects which have record entries in profile database 124 regarding their contact information and other identifying characteristics such as profession, and such information can be copied into the prospect database 132 or otherwise utilized by server 112. At this stage, prospect databases and profile databases typically do not include product related data such as a prospect's product need and preferences, except in some circumstances where the prospect is a previous client. The goal of this stage is to approach the customer to facilitate gathering additional data.

Approaching a prospect can take the form of directed advertising aimed at a particular prospect based on the profile stored at profile database 124, prospect database 132 and other relevant databases that exist in system 100. The directed advertising may include direct emails, or other forms of messages, aimed at individuals or a specific group of people such as patent lawyers, and other forms of directed messaging. At this point, variations in methods of directed advertising that can be performed by system 100 will now occur to one of skill in the art, all of which are contemplated as possible implementations of profile server 120 functionality and are considered within scope.

Continuing to refer to Table 1, the next stage of the example sales process is "Trunk" and corresponds to the process stage where the actions are directed at prospects which have actually began evaluating products and have actively engaged system 100. Continuing with the online-mobile phone retailer illustration discussed above, and once again referring to FIG. 3 and FIG. 4, the "Trunk" stage corresponds to prospect customers who are actually engaging an online store maintained by e-commerce server 126, examining, reviewing and evaluating information on products. The "Trunk" stage can also correspond to prospects who have inquired about specific products, promotions or packages by engaging e-commerce server 126 through messaging e-commerce server 126, or other methods of engagement. The goal of the Trunk stage is to expand the data records of profile database 124, prospect database 132 and other relevant databases in system 100 to include data beyond contact information and other personal characteristics and to aggregate data regarding product needs, preferences and choices specific to a prospect.

Data aggregation for prospects whose contact information is already present in various databases of system 100 can be accomplished by prompting users to fill out online questioners presented by e-commerce server 126, sending automated messages from e-commerce server 126 and parsing the replies, and other forms of data gathering which will now occur to a person of skill in the art, and are considered within scope.

The next stage of the example sales process is "Branch" and corresponds to the stage where the sales actions are directed at prospects for whom both contact information and product related data are present within various databases of system 100. Continuing with the online-mobile phone retailer illustration discussed above, and once again referring to FIG. 3 and FIG. 4, the "Branch" stage corresponds to prospect customers who have previously engaged the online store and otherwise provided additional data about their product preferences and needs to system 100. The goal of the "Branch" stage is to engage prospects beyond the data gathering stage and initiate actual sales discussions. The sales discussions can take the form of emailing, displaying or otherwise communicating offers and discounts to the prospect from e-commerce server 126, for example.

The "Branch" stage is a process stage which has three potential next stages. If the prospect actually completes a business transaction, the next stage is either a Bud, or a Fruit, depending on whether the prospect was a previous customer of e-commerce server 126. If, however, the prospect does not complete a business transaction, the stage goes back to "Root", since the customer is now a known prospect that has stopped engaging the system.

Continuing to refer to Table 1, the process stage "Bud" corresponds to the stage where the actions are directed at prospects which have engaged in a business deal at e-commerce 126 for the first time. Continuing with the online-mobile phone retailer illustration discussed above, and once again referring to FIG. 3 and FIG. 4, the "Bud" stage corresponds to prospects who have, for the first time, purchased something such as a phone contract from an online store maintained by e-commerce server 126. The goal of this stage is to move the prospect into a "Fruit" stage by getting them to purchase additional products and services, or by renewing their contract at its expiry. If the renewal does not take place, the customer may move to the "Root" stage instead.

Continuing to refer to Table 1, the process stage "Fruit" corresponds to the process stage where the prospect is a repeat customer of e-commerce server 126. Continuing with the online-mobile phone retailer illustration discussed above, and once again referring to FIG. 3 and FIG. 4, the "Fruit" stage corresponds to prospects who have previously purchased something such as a phone contract from an online store maintained by e-commerce server 126. The goal of this stage is to maintain the "Fruit" stage customer within the "Fruit" stage by getting them to purchase additional products such as phones and phone accessories, and also to renew their contract at its expiry. If the renewal does not take place, the customer can move to the "Root" stage instead.

Referring now to Table 2, the simplified example sales process defined in Table 1 is shown organised according to the structure of process database 128 as shown in FIG. 4, and stored on storage device 116. In this example process database 128 of Table 2, the first row shows the column labels. Starting with the second row and below, each row corresponds to a record 136 of the process database 128. Thus, according to Table 2, each record in the example process database 128 includes a record identifier 140 entry as identified by the leftmost column labeled "Record Identifier", a current stage 144 entry as identified by the column labeled "Current Stage", an actions 152 entry, as identified in the column labeled "Actions", a next stage 156 entry as identified by the column labeled "Next Stage" and a measures 160 entry as identified by the rightmost column labeled "Measures".

TABLE 2

An Example Process Database 128

| Record Identifier | Current Stage | Actions | Next Stage | Measures |
|---|---|---|---|---|
| "1" | "Nutrient" | Advertise | "Root" | "Nutrient growth rate" |
| "2" | "Root" | "Approach Prospect" | "Trunk" | "Root growth rate" |
| "3" | "Trunk" | "Assess Needs" | "Branch" | "Trunk growth rate" |
| "4" | "Branch" | "Offer Package 1" "Offer Package 2" "Offer Discounts" | "Bud", "Root", "Nutrient" | "Branch growth rate" |
| "5" | "Bud" | "Offer Upgrades" "Solicit Data on Future Needs" | "Fruit", "Root" | "Bud growth rate" |
| "6" | "Fruit" | "Offer Upgrades" "Solicit Data on Future Needs" "Prompt Customer to Recommend Store to Friends" | "Root" | "Fruit growth rate" |

Continuing with Table 2, the first process record 136 of the example process database 128 is shown in row two of the table. According to row two, the record identifier 140 entry for the first example process record 136 is set to "1", thus identifying the first record as record "1". The current stage 144 entry of record "1" is set to "Nutrient". The possible action at this stage, based on record "1"'s actions 152 entry, is "Advertise". Based on the next stage 156 entry of record "1", the next process stage that is reachable from the "Nutrient" stage is the "Root" stage. Furthermore, according to the measures 160 entry of record "1", the measurements that can be performed at the "Nutrient" stage include calculating "Nutrient growth rate", which includes any means for calculating market and market opportunity size, and purchasing power of the market, and their relevant growth rates over time.

Referring now to the third row of Table 2, the record identifier 140 entry for the second example process record 136 is set to "2". The current stage 144 entry for record "2" is set to "Root". The possible action at this stage, based on record "2"'s actions 152 entry is to "Approach Prospect". Based on the record "2"'s next stage 156 entry, the next stage reachable from the "Root" stage is the "Trunk" stage. The measurements that can be performed at the "Root" stage include calculating "Root growth rate", which includes any means for calculating the number of prospects at this stage, their estimated number of potential purchases and their relevant growth rates over time.

Referring next to the fourth row of Table 2, the record identifier 140 entry for the third example process record 136 is set to "3". The current stage 144 entry of record "3" is set to "Trunk". The possible actions based on this record's actions 152 entry is "Assess Needs". The next stage reachable from the "Trunk" stage is the "Branch" stage. The measurements that can be performed at the "Trunk" stage include calculating "Trunk growth rate", which includes any means for calculating the number of prospects at this stage, their estimated number of potential purchases and their relevant growth rates over time.

Referring now to the fifth row of Table 2, the record identifier 140 entry for the fourth example process' record 136 is set to "4". The current stage 144 entry of record "4" is set to "Branch". The possible actions at this stage, based on this record's actions 152 entry are "Offer Package 1", "Offer Package 2" and "Offer Discounts". The next stages reachable from the "Branch" stage are the "Bud", "Root" and "Nutrient" stages. The measurements that can be performed at the "Branch" stage include calculating "Branch growth rate", which includes any means for calculating the number of prospects at this stage, potential value of initial purchase and their relevant growth rates over time.

Referring now to the sixth row of Table 2, the record identifier 140 entry for the fifth example process record 136 is set to "5". The current stage 144 entry of record "5" is set to "Bud". The possible actions at this stage, based on this record's actions 152 entry, are: "Offer Upgrades" and "Solicit Data on Future Needs". The next stages reachable from the "Bud" stage are "Fruit" and "Root" stages. The measurements that can be performed at the "Bud" stage include calculating "Bud growth rate", which includes any means for calculating the number of prospects at this stage, value of their purchases and their relevant growth rates over time.

Referring now to the last row of Table 2, the record identifier 140 entry for the sixth example process record 136 is set to "6". The current stage 144 entry of record "6" is set to "Fruit". The possible actions for this record are "Offer Upgrades", "Solicit Data on Future Needs", and "Prompt Customer to Recommend Store to Friends". The next stage reachable from the "Fruit" stage is the "Root" stage. The measurements that can be performed at the "Fruit" stage include calculating "Fruit growth rate", which includes any means for calculating the number of prospects at this stage, their purchasing power and their related growth rates over time.

Table 3 shows the contents of a simplified example prospect database 132 that is stored on storage device 116, and organized according to the structure of prospect database 132 as shown in FIG. 4. The example prospect database 132 shown in Table 3 is associated with example process database 128 of Table 1, as explained below. In this example database of Table 3, the first row shows the column labels. Starting with the second row and below, each row corresponds to a record 164 of the prospect database 132. Thus, according to Table 3, each record in the example prospect database 132 includes a record identifier 168 entry as identified by the leftmost column labeled "Record Identifier", a prospect name 172 entry as identified by the column labeled "Prospect Name" and a prospect stage 176 entry as identified by the column labeled "Prospect Stage".

TABLE 3

An Example Prospect Database 132

| Record Identifier | Prospect Name | Prospect Stage |
| --- | --- | --- |
| "A" | "Market" | "Nutrient" |
| "B" | "Patent Lawyers" | "Root" |
| "C" | "John Drafter" | "Trunk" |
| "D" | "Michael Billings" | "Branch" |
| "E" | "Suzan Success" | "Bud" |
| "F" | "Bigwan Partner" | Fruit |

Continuing with Table 3, the first example prospect record 164 of the example prospect database 132 is shown in row two of the table. According to row two, the record identifier 168 entry for the first example record 136 is set to "A", thus identifying the first prospect record 164 as record "A". The prospect name 172 entry of this record, record "A", is set to "Market". The prospect stage 176 entry for record "A" is "Nutrient" and corresponds to the current stage 144 entry of record "1" of example process database 128 of Table 1. For the example databases 128 and 132, the prospect stage 176 entry of Table 3 is related to the current stage 144 entry of Table 2. Namely, in this example, Column 2 values of Table 3 are set to one of the values that exist in one of the entries of Column 2 of Table 2. Accordingly, in the present example, referring to Table 1, current prospect stage 176 entries of example database 132 can be set to one of the following values: "Nutrient", "Root", "Trunk", "Branch", "Bud" and "Fruit".

Referring now to the third row of Table 3, the record identifier 168 entry for the second example prospect record 164 is set to "B". The prospect name 172 entry of this record, record "B", is set to "Patent Lawyers". These prospect stage 176 entry for record "B" is set to "Root".

Referring now to the fourth row of Table 3, the record identifier 168 entry for the third example prospect record 164 is set to "C". The prospect name 172 entry of this record, record "C", is set to "John Drafter". The prospect stage 176 entry for record "C" is set to "Trunk".

Referring now to the fifth row of Table 3, the record identifier 168 entry for the fourth example prospect record 164 is set to "D". The prospect name 172 entry of this record, record "D", is set to "Michael Billings". The prospect stage 176 entry for record "D" is set to "Branch".

Referring now to the sixth row of Table 3, the record identifier 168 entry for the fifth example prospect record 164 is set to "E". The prospect name 172 entry of this record, record "E", is set to "Suzan Success". The prospect stage 176 entry for record "E" is set to "Bud".

Referring now to the last row of Table 3, the record identifier 168 entry for the sixth example prospect record 164 is set to "F". The prospect name 172 entry of this record, record "F", is set to "Bigwan Partner". The prospect stage 176 entry for record "F" is set to "Fruit".

Figure 5:
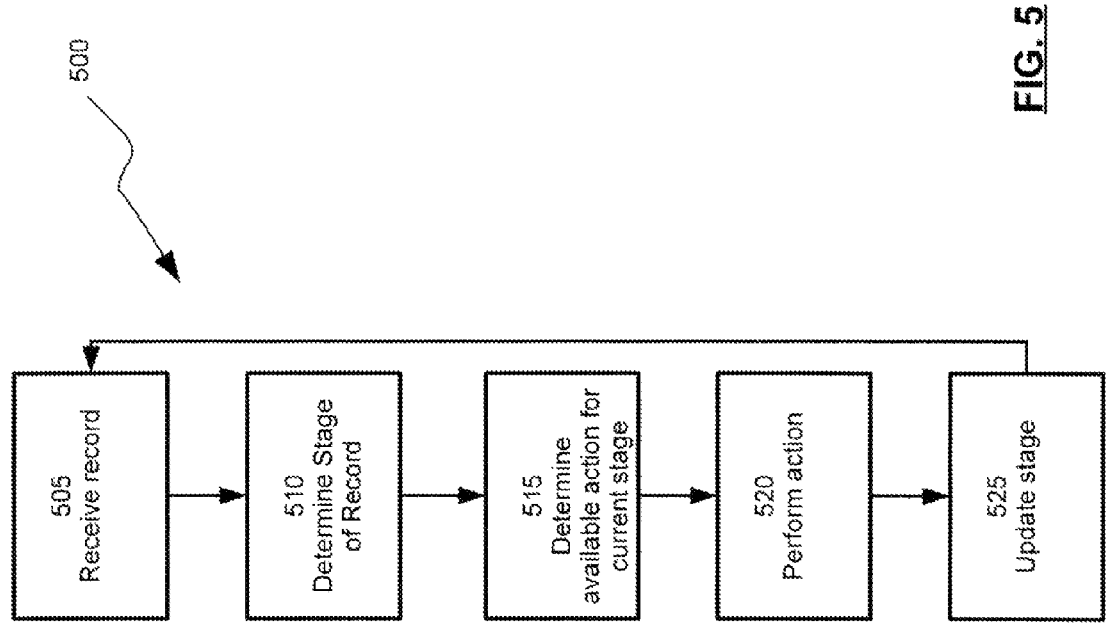
FIG. 5 shows a flow chart showing a method of process management in accordance with an embodiment.

Referring now to FIG. 5, a method of process management is indicated generally at 500. In order to assist in the explanation of the method, it'll be assumed that method 500 is operated using system 100 as shown in FIG. 3, system 100 further operating on example databases 128 and 132, as shown in FIG. 4, and Tables 2 and 3. Additionally, the following discussion of method 500 leads to further understanding of system 100. However, it is to be understood that system 100, and method 500 can be varied, and need not work exactly as discussed herein in conjunction with each other, and that such variations are within scope.

Beginning first at step 505, a prospect record 164 of prospect database 132 is received at server 112. At this point, to assist with the explanation of the method 500, it'll be assumed that the received prospect record 164 is record "A", the contents of which are as shown in row 2 of Table 3. Assuming that a record 164 is validly received, method 500 advances to step 510.

At step 510, the current sales process stage of the prospect is determined. To make the determination, server 112 retrieves the prospect stage 176 entry of record "A", which, in this example, as discussed above, is set "Nutrient". Accordingly, the current prospect is at the "Nutrient" stage. As explained above, in relation to the example sales process of Table 1, the "Nutrient" stage is the stage at which the prospect customers are unknown to system 100. Accordingly, as shown in Table 3, the prospect name 172 entry is set to "Market" to indicate that the prospect is the entire market. The choice of the name "Market" is exemplary only, and any other name could have been chosen for the purposes of operating method 500.

At step 515, the available actions for the current sales process stage is determined. As was discussed above, prospect stage 176 entry corresponds to the current stage entry 144 of the example process database 128, which also includes the actions 152 entry for actions available at a given process stage identified by a process record 136. Accordingly, to make the determination of available actions, server 112 first accesses example process database 128. Next, server 112 identifies the process record 136 which has its current stage entry 144 set to "Nutrient", which, according to Table 2, is the record with the record identifier set to "1". Retrieving the corresponding actions 152 entry for record "1", server 112 identifies the available action at this stage to be "Advertise".

At step 520 one or more of the identified actions are performed. As mentioned, in this example, the available action is "advertise". As discussed above, in light of Table 1 and the online-mobile phone retailer illustration, advertising can include posting sales and marketing information, through the use of profile server 120, to third party services such as Facebook™ and Twitter™, as well as other information providers such as web content providers. Advertising can also include providing online advertising postings through online advertising services such as Google Adwords™. This information can be included as part of the process database 128, or stored in a separate structure and located within System 100. At this step, server 112 triggers the execution of one or more of these available advertising actions, engaging other components of system 100, such as the profile server 120, and e-commerce server 126, as necessary to complete the execution of the identified actions. At this point is should be apparent to a person of skill in the art that the execution of advertising actions can be accomplished through a variety of methods, including through the engagement of systems outside of system 100, and that all of these variations are within scope.

At step 525, the current process stage of the prospect is updated based on results data. To assist with the explanation of method 500, it'll be assumed that the advertising action has resulted in gathering of user profile data, and hence the prospect stage 176 entry of record "A" is updated to "Root". At this step, the prospect name 172 entry of the prospect record "A" can also be updated to reflect the gathered profile information, which in this case will be assume to be updated to "Dentists". The resulting updated example prospect database 132' is shown in Table 4. At this point method 500 returns to step 505. In an alternative performance of method 500, the advertising action might not have resulted in any client profile data. In that alternative performance of this step, the record "A" can be left unaltered if the advertising actions do not result in any new profile data. In that case, the resulting example prospect database 132 would be the same as that shown in Table 2. Namely, record "A", would have stayed at the same stage, "Nutrient", and there would be no corresponding name change.

TABLE 4

Updated Example Prospect Database 132'

| Record Identifier (168) | Prospect Name (172) | Prospect Stage (176) |
|---|---|---|
| "A" | "Dentists" | "Root" |
| "B" | "Patent Lawyers" | "Root" |
| "C" | "John Drafter" | "Trunk" |
| "D" | "Michael Billings" | "Branch" |
| "E" | "Suzan Success" | "Bud" |
| "F" | "Bigwan Partner" | "Fruit" |

It is to be understood that the process management method 500, as shown in FIG. 5, can be performed in a number of different ways. For example, process management method can make use of a graphical object for gathering, filtering and organizing various process management related databases. As described above, the management of a process by system 100 can involve the use of many components and databases. Mapping, to a graphical object, data that is being tracked in accordance with the managed process, provides a method of tracking and organizing data that is reduced in size, complexity and storage needs by gathering, and filtering various process-relevant data and databases. Organized data can allow for efficient communications between server 112 and clients 104, as well as other components of system 100.

The graphical object used for organizing data can be stored as a pre-parsed data structure at storage device 116 of server 112, and accessed by server 112 to be updated, as the process database 128, prospects database 132, and other relevant databases of system 100 are updated. Moreover, the pre-parsed graphical object can be transmitted to a client terminal 104 where it can be parsed and displayed on its display. In yet other variations, after parsing the pre-parsed graphical object at server 112, the results can be transmitted to a client 104 to be used for updating its display. In other variations, a graphical object can be generated directly from relevant databases 128, 132 and others, and displayed on a display directly at server 112, or transmitted to a client 104 to be used for updating its display. In a variation, the generated graphical object can be in the form of vector or bitmap based graphics.

It will now occur to a person of skill in the art that variations in the storage, parsing and display of the graphical object exist and all variations are contemplated and are within scope.

Figure 6:
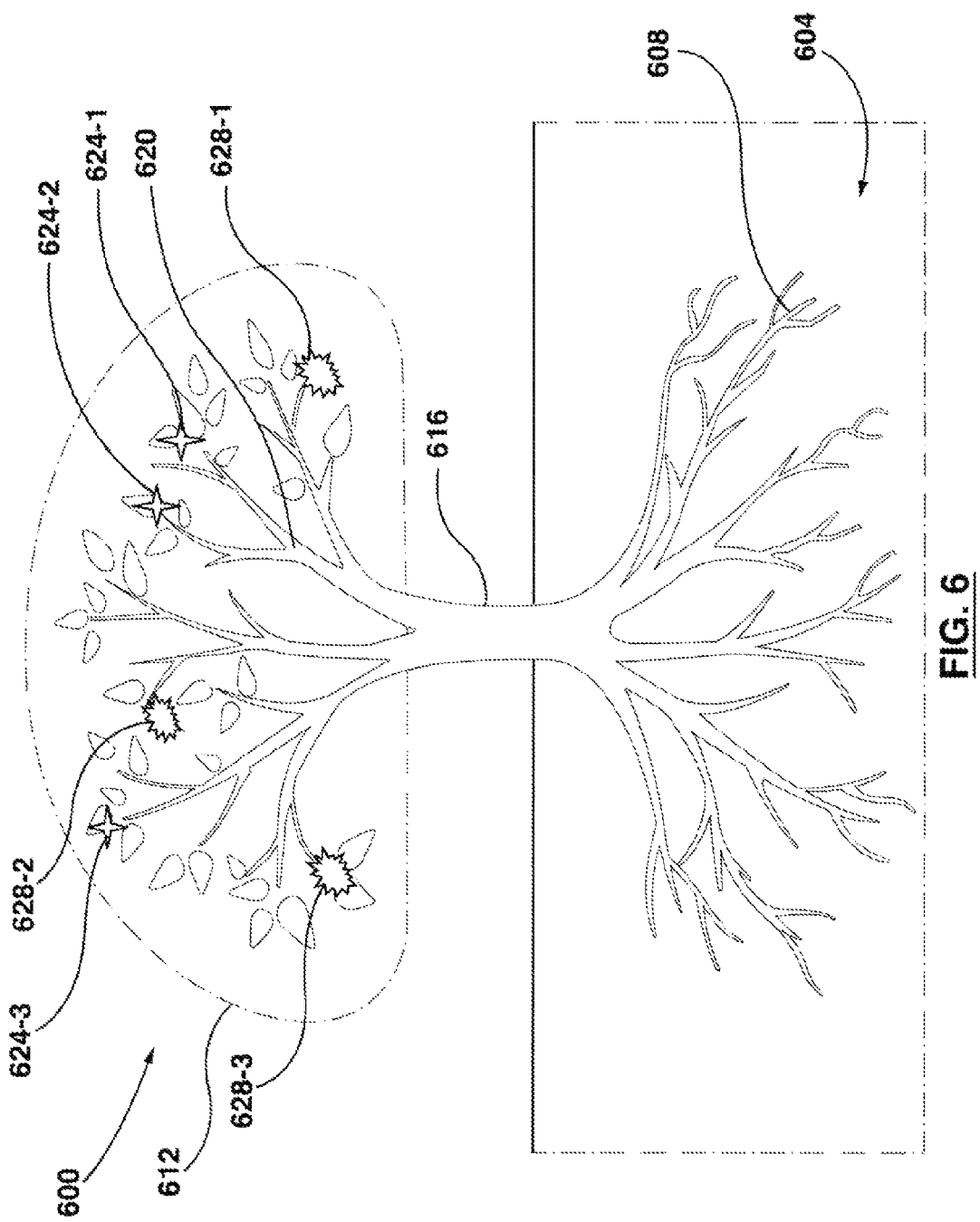
FIG. 6 shows a diagram of a graphical object in accordance with an embodiment.

Referring now to FIG. 6, an example graphical object 600 as displayed is shown. The example graphical object 600 is shown organized in accordance with the example process database 128 as given in Table 2 above, and stored on storage device 116. Accordingly, graphical object 600 contains one or more portions that correspond to each current stage 144 entry shown in example process database 128. Thus, nutrients 604, the boxed area, correspond to the current stage 144 entry "Nutrient" of record "1", as shown in row 2 of Table 2. Roots 608, the roots of the tree 612 shown as part of graphical object 600, correspond to the current stage 144 entry "Root" of record "2", as shown in row 3 of Table 2. Trunk 616, the trunk of the tree 612, corresponds to the current stage 144 entry "Trunk" of record "3", as shown in row 4 of Table 2. Branches 620, the branches of the tree 612, correspond to the current stage 144 entry "Branch" of record "4", as shown in row 5 of Table 2. Buds 624 (624-1, 624-2, 624-3), the buds of the tree 612, are indicated as stars in FIG. 6, correspond to the current stage 144 entry "Bud" of record "5", as shown in row 6 of Table 2. Collectively, buds 624-1, 624-2 and 624-3 are referred to as buds 624, and generically as bud 624. This nomenclature is used elsewhere herein. Fruits 628 (628-1, 628-1 and 628-3), the fruits of the tree 612, indicated as jagged ovals in FIG. 6, correspond to the current stage 144 entry "Fruit" of record "6", as shown in row 6 of Table 2. Collectively, fruits 628-1, 628-2 and 628-3 are referred to as fruits 628, and generically as fruit 628. This nomenclature is used elsewhere herein. The number of buds 624 and fruits 628 are chosen for illustration purposes only and in other variations can vary.

Figure 7:
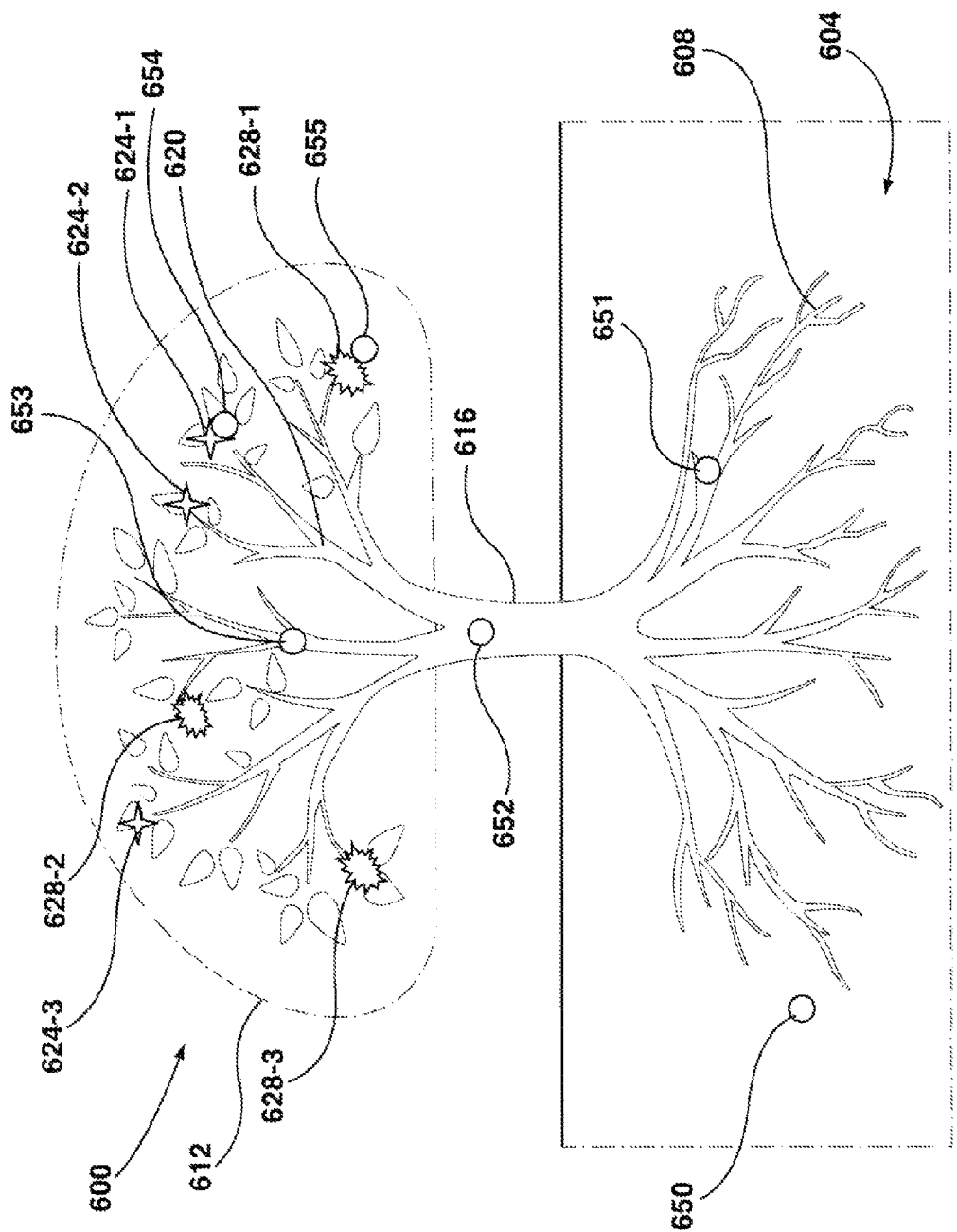
FIG. 7 shows a diagram of a graphical object in accordance with an embodiment.

Moving now to FIG. 7, contents of example prospect database 132 of Table 3 can also be associated with portions of the graphical object 600. For example, graphical object 600 can include additional indicia representing each example prospect record 164. Alternatively, the indicia can be stored as a separate object and combined with the graphical object 600 at the time of parsing or overlaid with graphical object 600 at the time of display.

In FIG. 7, each record of the example prospect database 132 is shown as an indicia as part of the graphical object 600. Accordingly, circle 650 corresponds to the record "A" as shown in row 2 of Table 3, and is placed within nutrients 604 portion of the graphics object 600 since the prospect stage 176 entry for record "A" is "Nutrient" and corresponds to the process stage of record "1" of example process database 128 of Table 2. Circle 651 corresponds to record "B" as shown in row 3 of Table 3, and is placed within roots 608 portion of the graphics object 600 since the prospect stage 176 entry for record "B" is "Root" and corresponds to the process stage of record "2" of example process database 128 of Table 2. Circle 652 corresponds to the record "C" as shown in row 4 of Table 3, and is placed within trunk 616 portion of the graphics object 600 since the prospect stage 176 entry for record "C" is "Trunk" and corresponds to the process stage of record "3" of example process database 128 of Table 2.

Continuing with FIG. 7, circle 653 corresponds to the record "D" as shown in row 5 of Table 3, and is placed within branches 620 portion of the graphics object 600 since the prospect stage 176 entry for record "D" is "Branch" and corresponds to the process stage of record "4" of example process database 128 of Table 2. Circle 654 corresponds to the record "E" as shown in row 6 of Table 3, and is placed within buds 624 portion of the graphics object 600 since the prospect stage 176 entry for record "E" is "Buds" and corresponds to the process stage of record "5" of example process database 128 of Table 2. Circle 655 corresponds to the record "F" as shown in row 7 of Table 3, and is placed within fruits 628 portion of the graphics object 600 since the prospect stage 176 entry for record "F" is "Fruit" and corresponds to the process stage of record "6" of example process database 128 of Table 2.

It will now occur to those of skill in the art that variations are possible in mapping the contents of example process database 128 and example prospect database 132 to a graphical object are possible, and that all of these variations are contemplated and are within scope. For example, in FIG. 7, each circle corresponds to a single prospect record 164 of the example prospect database 132. In variations, however, multiple records can correspond to a single circle, with the diameter of the circle growing in relation with the number of records that are associated with it. In other variations, the shape or color associated with a prospects record 164 can change, indicating additional information about the record. In further variations, the tree 612 can change shape on the basis of activity at each stage. For example the roots 608 can grow as prospects at "Nutrient" or "Root" stage increases in numbers, or the branches 620 can grow as the number of prospects at the "Branch" stage increases. In other variations, the changes in size can be based on attributes such as monetary amount or resources represented at each stage. In further variations, changes in size of the parts of tree 612 can be based on measures related to each stage. In yet other variations, size differences can indicate imbalance in the working of the process, and thus help determine resource allocation for each stage. Also, the tree 612 can be replaced with a flowering plant, or other graphical objects that correspond with the stages of the process being managed.

In other variations, textual descriptions can also be added to various graphical objects, such as a prospect name 172 entry value of a prospect record 164 can accompany its corresponding circle in graphics object 600. In yet other variations, additional textual and graphical information may be obtained after further interaction with the graphical object 600, such as displaying additional information regarding a particular stage, after the selection of a specific portion of the graphical object 600 that corresponds to that stage.

Figure 8:
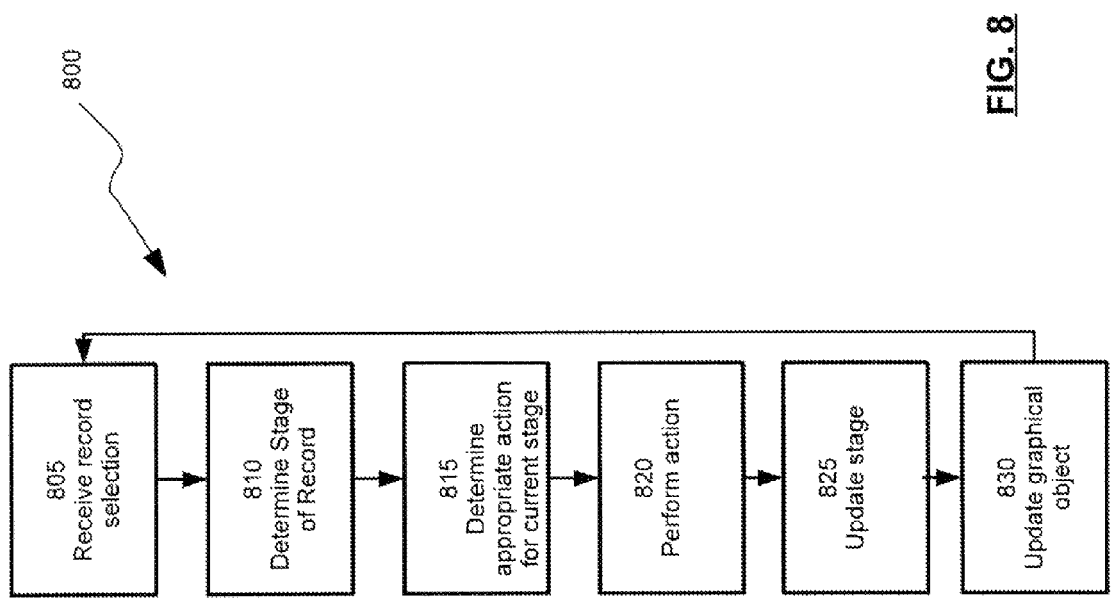
FIG. 8 shows a flow chart showing a method of process management and process data organization in accordance with an embodiment.

Referring now to FIG. 8, to illustrate the method of process management and process data organization using graphical objects, a modified version of method 500 is shown generally at 800. In order to assist in the explanation of the method, it'll be assumed that method 800 is operated using system 100 as shown in FIG. 3, system 100 further operating on example databases 128 and 132, as shown in FIG. 4, and Tables 2 and 3, as well as the graphical object 600 shown in FIG. 7. In addition, the following discussion of method 800 leads to further understanding of system 100. However, it is to be understood that system 100, and method 800 can be varied, and need not work exactly as discussed herein in conjunction with each other, and that such variations are within scope.

Beginning first at step 805, a prospect record 164 of example prospect database 132 is received at server 112 based on a selection from the graphical object 600 as shown in FIG. 7. At this step, to assist with the explanation of the method 800, it'll be assumed that the received prospect record 164 is record "A", as shown in Table 3, with the corresponding graphical object representation of circle 650 as shown in FIG. 7. The received record selection can occur, for example, based on an interaction with the graphical object 600 at a display linked to client 104, to select circle 650. Alternatively, the record selection can occur based on a selection made from a display of example database 132 at any one of the components of system 100. At this point it will occur to a person of skill in the art that there are various methods of selecting a record, and all of these variations are contemplated and are within scope.

At step 810, the current sales process stage of the selected prospect record 164 is determined. Continuing with the example based on Table 3, at this step server 112 retrieves the prospect stage 176 entry of record "A", which, in this example, as discussed above, is set to "Nutrient". Accordingly, the selected prospect is at the "Nutrient" stage. As explained above, in relation to the example sales process of Table 1, the "Nutrient" stage is the stage at which the prospect customers are unknown to system 100. Accordingly, as shown in Table 3, the prospect name 172 entry is set to "Market" to indicate that the prospect is the entire market. The choice of the name "Market" is exemplary only, and any other name could have been chosen for the purposes of operating method 800.

At step 815, the appropriate actions for the current sales process stage of the selected prospect record is determined. As discussed above, prospect stage 176 entry corresponds to the current stage 144 entry of the example process database 128, which also includes the actions 152 entry for actions available at a given process stage identified by a process record 136. Accordingly, to make the determination of available actions, server 112 first accesses example process database 128. Next, server 112 identifies the process record 136 which has the current stage entry 144 set to "Nutrient", which, according to Table 2, is the record with the record identifier set to "1". Retrieving the corresponding actions 152 entry for record "1", server 112 identifies the available action at this stage to be "Advertise".

At step 820, one or more of the identified actions are performed. In this example, the available action is "Advertise". As discussed above, in light of Table 1 and the online-mobile phone retailer illustration, advertising can include posting sales and marketing information, through the use of profile server 120, to third party services such as Facebook™ and Twitter™, as well as other information providers such as web content providers. Advertising can also include providing online advertising postings through online advertising services such as Google Adwords™. At this step, server 112 triggers the execution of one or more of these available advertising actions, utilizing other components of system 100, such as the profile server 120, and e-commerce server 126, as necessary to complete the execution of the identified actions. At this point is should be apparent to a person of skill in the art that the execution of advertising actions can be accomplished through a variety of methods, including through the engagement of systems outside of system 100, and that all of these variations are within scope.

At step 825, the current process stage of the selected prospect is updated based on results data. To assist with the explanation of method 800, it'll be assumed that the advertising action has resulted in gathering of user profile data, and hence the prospect stage 176 entry of record "A" is updated to "Root". At this step, the prospect name 172 entry of the prospect record "A" can also be updated to reflect the gathered profile information from profile database 124, for example. In this case, it will be assumed that the prospect name 172 entry is updated to "Dentists". The resulting updated example prospect database 132' is shown in Table 4 above. In that alternative performance of this step, the record "A" can be left unaltered if the advertising actions do not result in any new profile data. In that case, the resulting example prospect database 132 would be the same as that shown in Table 2. Namely, record "A", would have stayed at the same stage, "Nutrient", and there would be no corresponding name change.

Figure 9:
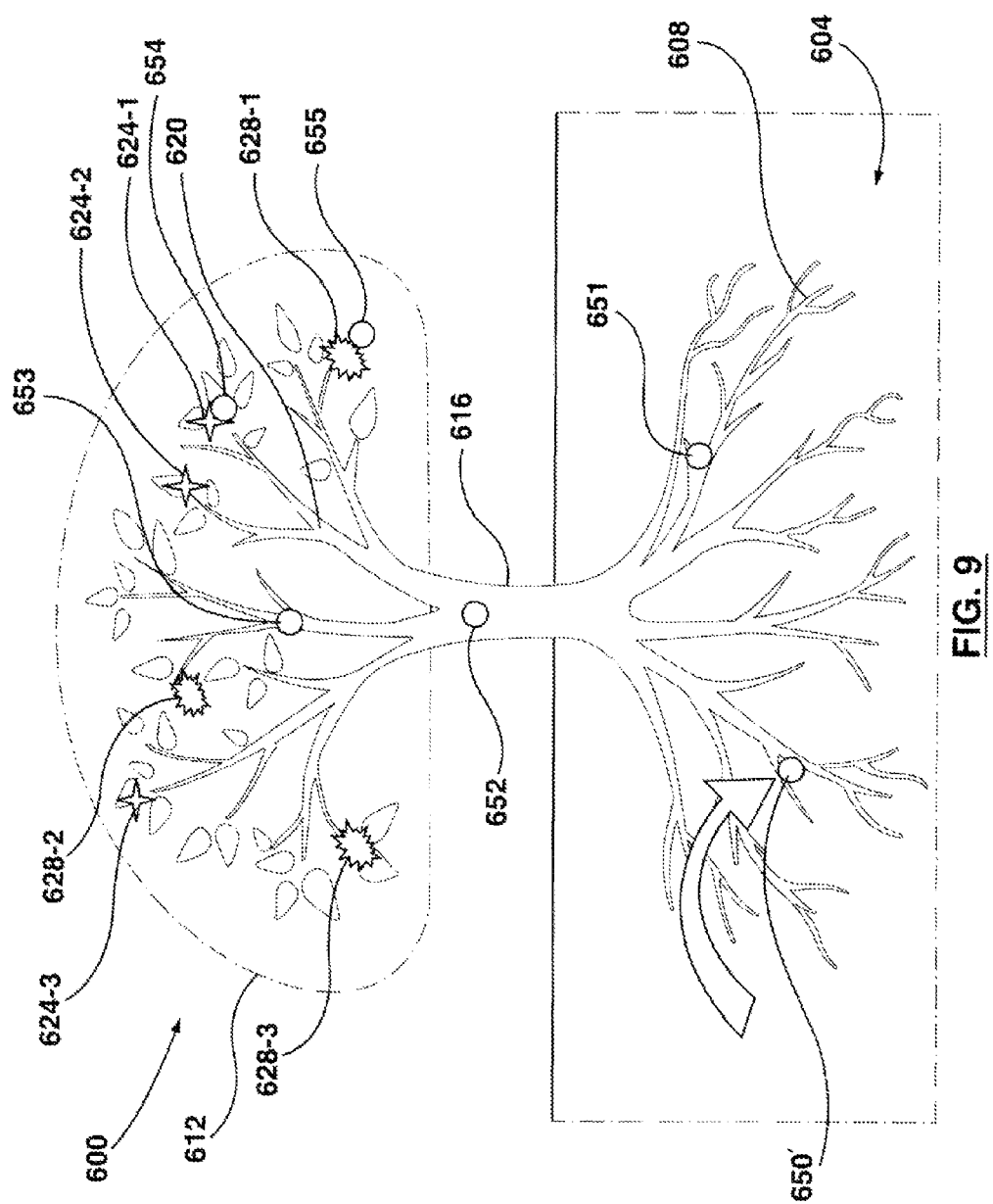
FIG. 9 shows a diagram of a graphical object in accordance with an embodiment.

Moving to step 830, the graphical object 600 is updated. As shown in FIG. 9, to reflect the change in prospect stage 176 entry of record "A" from "Nutrient" to "Root", circle 650 is moved from the nutrients 604 portion to the roots 608 portion of the graphical object 600, and is now labeled 650' to reflect the updates. At this point, method 800 returns to step 805.

Continuing with the operation of method 800, at step 805, a prospect record 164 of prospect database 132' is received at server 112 based on a selection from a graphical object. At this step, to assist with the explanation of the method 800, it'll be assumed that the received prospect record 164 is record "A", as shown in Table 4, with the corresponding graphical object representation of circle 650' as shown in FIG. 9. Assuming that a record 164 is validly received, method 800 advances to step 810.

At step 810, the selected prospect's stage is determined. Continuing with the example based on Table 4, at this step server 112 retrieves the prospect stage 176 entry of record "A", which, in this example, is now set to "Root".

At step 815, the appropriate actions for the current sales process stage is determined. As was discussed above, to make the determination, server 112 accesses example process database 128 and retrieves the actions 152 entry for the process record 136 corresponding to the stage "Root", namely record "2". Server 112 thus identifies the available action at this stage to be "Approach Prospect".

At step 820, one or more of the identified actions are performed. In this example, the available action is "Approach Prospect". As discussed above, in light of Table 1 and the online-mobile phone retailer illustration, approaching a prospect can take the form of directed advertising aimed at a particular prospect based on the profile stored at profile database 124, prospect database 132' and other relevant databases that exist in system 100. In this example, it will be assumed that directed advertising involves emails to a group of dentists who are members of a dentists association using a common association email.

At step 825, the current process stage of the selected prospect is updated based on results data. To assist with the explanation of method 800, it'll be assumed that directed advertising at step 820 has resulted in gathering of an individual prospect profile data, and hence the prospect stage 176 entry of record "A" is updated to "Trunk". At this step, the prospect name 172 entry of the prospect record "A" can also be updated to reflect the gathered profile information from profile database 124, for example. In this case, it will be assumed the prospect name 172 entry is updated to "Joe Dent". The resulting updated example prospect database 132" is shown in Table 5.

TABLE 5

Updated Example Prospect Database 132"

| Record Identifier (168) | Prospect Name (172) | Prospect Stage (176) |
|---|---|---|
| "A" | "Joe Dent" | "Trunk" |
| "B" | "Patent Lawyers" | "Root" |
| "C" | "John Drafter" | "Trunk" |
| "D" | "Michael Billings" | "Branch" |
| "E" | "Suzan Success" | "Bud" |
| "F" | "Bigwan Partner" | "Fruit" |

Figure 10:
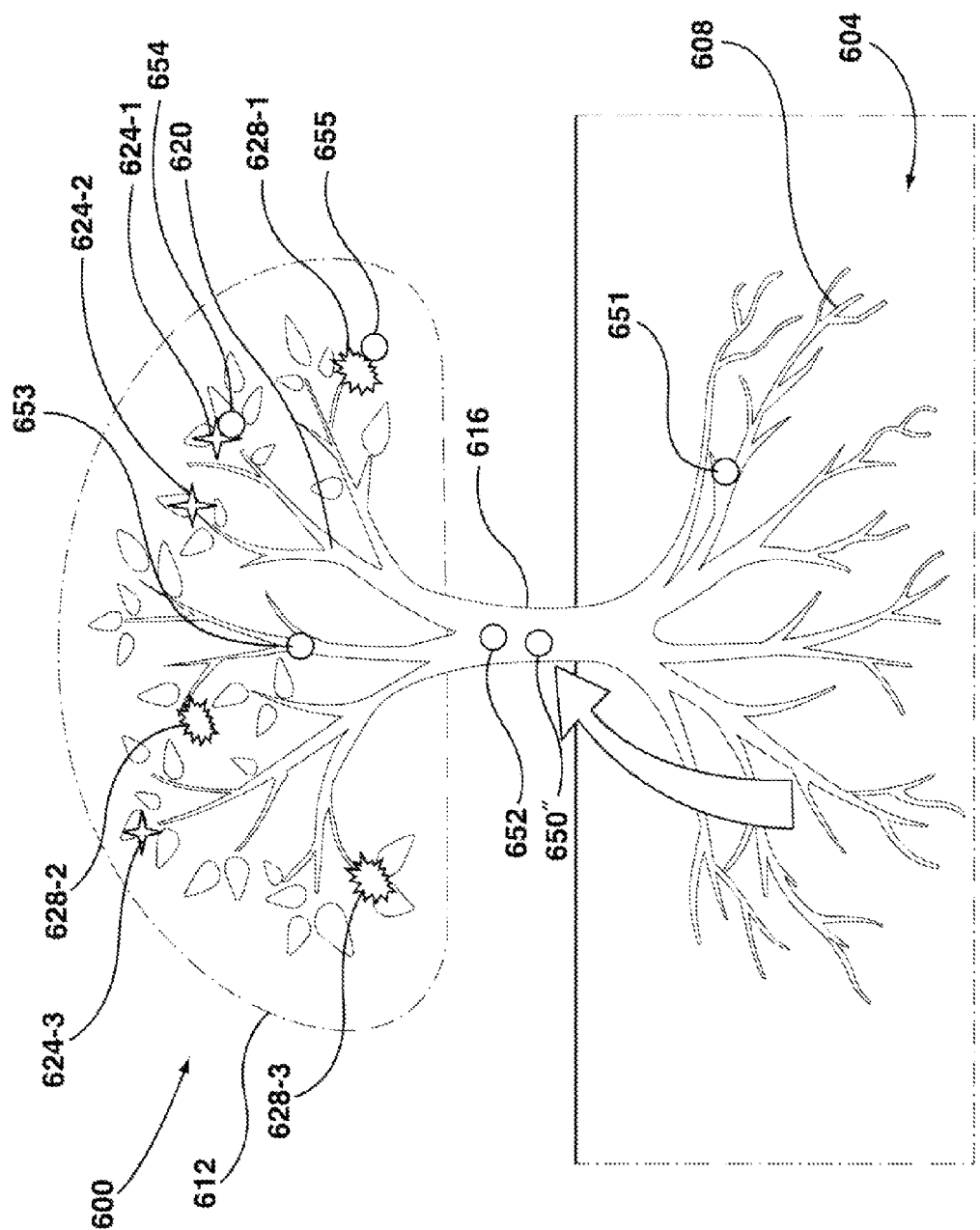
FIG. 10 shows a diagram of a graphical object in accordance with an embodiment.

Moving to step 830, the graphical object 600 is updated. As shown in FIG. 10, to reflect the change in prospect stage 176 entry of record "A" from "Root" to "Trunk", circle 650' is moved from the roots 604 portion to the trunk 616 portion of the graphical object 600, and now labeled 650''' to reflect the updates. At this point method 800 returns to step 805.

Continuing with the operation of method 800, at step 805, a prospect record 164 of prospect database 132'' is received at server 112 based on a selection from a graphical object. At this step, to assist with the explanation of the method 800, it'll be assumed that the received prospect record 164 is record "F", as shown in Table 5, with the corresponding graphical object representation of circle 655 as shown in FIG. 10. Assuming that a record 164 is validly received, method 800 advances to step 810.

At step 810, the selected prospect's stage is determined. Continuing with the example based on Table 5, at this step server 112 retrieves the prospect stage 176 entry of record "A", which, in this example, is now set to "Fruit".

At step 815, the appropriate actions for the current sales process stage is determined. As was discussed above, to make the determination, server 112 accesses example process database 128 and retrieves the actions 152 entry for the process record 136 corresponding to the stage "Fruit", namely record "6". Server 112 thus identifies the available actions at this stage to be "Offer Upgrades", "Solicit Data on Future Needs", "Prompt Customer to Recommend Store to Friends".

At step 820, one or more of the identified actions are performed. In this example, the chosen action is "Offer Upgrades". As discussed above, in light of Table 1 and the online-mobile phone retailer illustration, offering upgrades can take the form of directed advertising aimed at a particular prospect based on the profile stored at profile database 124, prospect database 132' and other relevant databases that exist in system 100. In this example, it will be assumed that directed advertising involves emails to "Bigwan Partner".

At step 825, the current process stage of the selected prospect is updated based on results data. To assist with the explanation of method 800, it'll be assumed that directed advertising at step 820 has resulted in gathering of an individual prospect profile data for the upgrades, and hence the prospect stage 176 entry of record "F" is updated to "Root". The resulting updated example prospect database 132''' is shown in Table 6.

TABLE 6

Updated Example Prospect Database 132'''

| Record Identifier (168) | Prospect Name (172) | Prospect Stage (176) |
| --- | --- | --- |
| "A" | "Joe Dent" | "Trunk" |
| "B" | "Patent Lawyers" | "Root" |
| "C" | "John Drafter" | "Trunk" |
| "D" | "Michael Billings" | "Branch" |
| "E" | "Suzan Success" | "Bud" |
| "F" | "Bigwan Partner" | "Root" |

Figure 11:
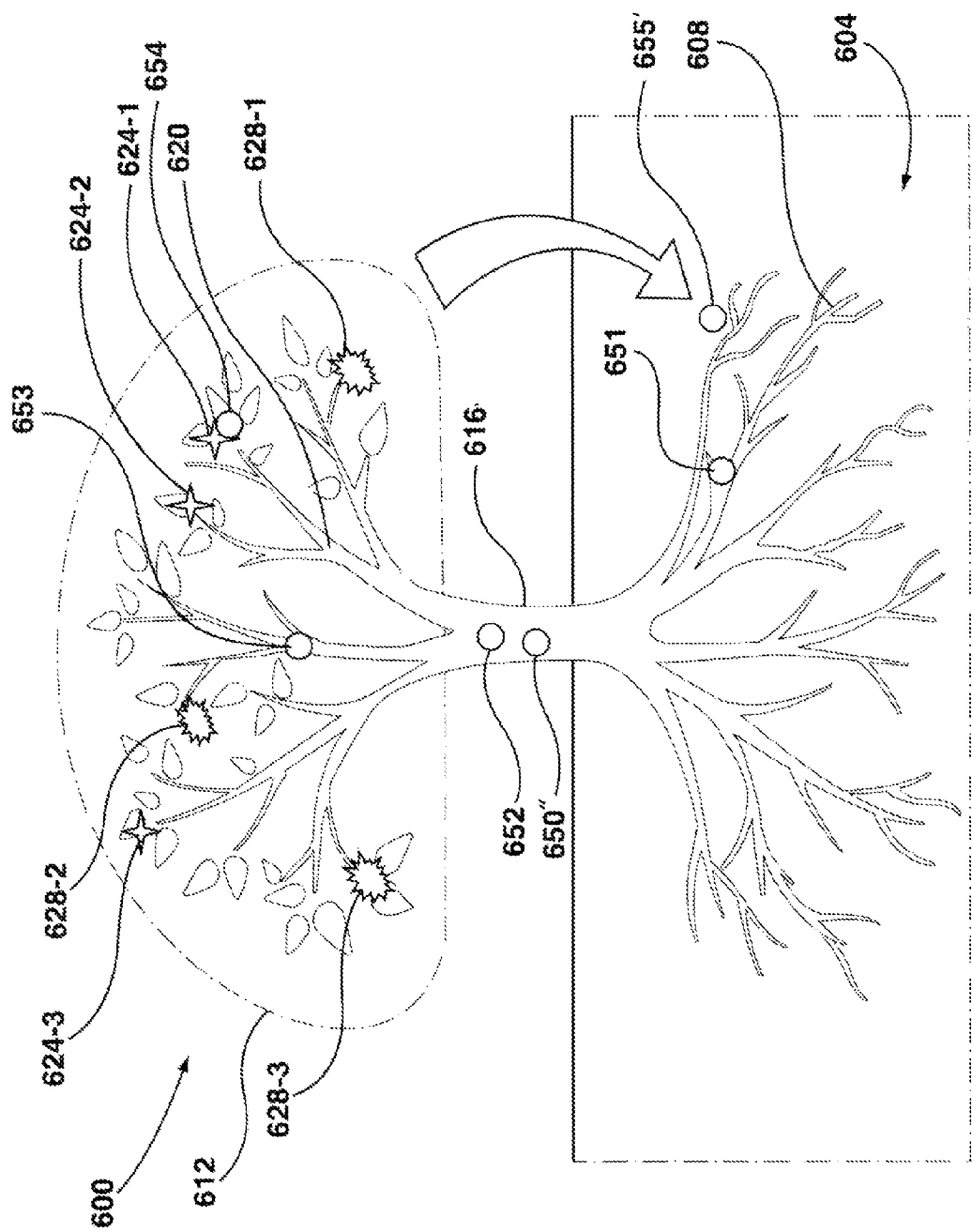
FIG. 11 shows a diagram of a graphical object in accordance with an embodiment.

Moving to step 830, the graphical object 600 is updated. As shown in FIG. 11, to reflect the change in prospect stage 176 entry of record "F" from "Fruit" to "Root", circle 655 is moved from the fruits 628 portion to the root 608 portion of the graphical object 600, and now labeled 655' to reflect the updates. At this point method 800 returns to step 805.

Even though the example sales process shown in Table 1 includes only 6 process stages, in other variations, a process can include additional or fewer stages. For example, a process can include an additional stage of "Weed" representing disgruntled or dissatisfied customers. In yet other variations, example stages shown in column one of Table 1 can be given different designations or names. For example, the "Nutrient" stage can be named the "Seed" stage. Alternatively, the "Nutrient" stage can be divided into two separate stages, where the existing "Nutrient" stage can correspond to prospects that are unknown but actively pursuing market opportunities, and an additional stage "Soil" can correspond to unknown prospects that are inactive in the market.

Moreover, although the example process of Table 1 is that of a sales process, it will now occur to one of skill in the art that system 100 and methods 500 and 800 can be applied to the management of different processes data. For example, system 100 and methods 500 and 800 can be applied to the management of data associated with the active elements and resources of an organization. The elements can comprise the given stage alone, or can be included as part of a process stage, such as the example process of Table 1. To illustrate, the example process of Table 1 can include, at the "Root" stage, marketing resources, such as a marketing web server, for capturing unknown prospects at the "Nutrient" stage through for example an email campaign, and transitioning them to the "Trunk" stage. As a further illustration, the "Trunk" stage can include a database element which stores known prospects actively engaged with System 100. As an additional illustration, the "Branch" stage can include sales resources to engage the prospects which are stored at the "Trunk" stage database.

Elements or resources can also be inputs to a process stage. Inputs can be elements and resources that contribute positively or negatively to actions at a given stage. For example, one input for the "Nutrient" stage could be "Weather", and represent the consideration of regulatory rules and requirements for advertising to unknown prospects. Another input could be the "Owner", and represent the resources the owner of the process is willing to input into a given stage. "Leaves", can also be an input, representing employees and their contribution to an action at a given stage.

In further variations, system 100 and methods 500 and 800 can be applied to the management of different processes including workflows. In yet other variations, one or more processes, workflows and elements can be combined. These and other variations are contemplated as possible implementations of system 100 and are considered within scope.

Although in Table 3 each prospect is represented to be at a single stage of the example process of Table 1, in other variations, each prospect can be at multiple stages. For example, a prospect can be both at the "Fruit" stage for being a repeat customer, and at the "Trunk" stage for engaging the system for additional potential transactions. In a variation, a prospect can be both at the "Bud" stage for being a first time customer, and at the "Weed" stage for being disgruntled.

The above-described embodiments are intended to be examples and alterations and modifications may be effected thereto, by those of skill in the art, without departing from the scope which is defined solely by the claims appended hereto.

We claim:

1. A method of updating a stage of a prospect record at a computer, comprising:

rendering a graphical object stored as a pre-parsed data structure having at least first and second portions associated with first and second stages, respectively, of a process;

receiving, in at least one processing unit, a prospect record;

determining, using said at least one processing unit, that said prospect record is associated with said first stage;

rendering an indicia for said prospect record on said first portion of said graphical object associated with said first stage;

determining, using said at least one processing unit, an available action associated with said first stage;

triggering a performance of said available action;

receiving, in said at least one processing unit, results data based on said performance;

associating, using said at least one processing unit, based on said results data, said prospect record with said second stage; and rendering said indicia on said second portion of said graphical object associated with said second stage.

2. The method of claim 1 wherein said graphical object is a representation of a tree.

3. The method of claim 2 wherein at least one of said first and second portions associated with said first and second stages is selected from a nutrient around said tree, a bud of said tree and a fruit of said tree, wherein said nutrient is associated with a stage associated with an advertising action, wherein said bud is associated with a stage associated with an upgrade or data collection action, and wherein said fruit is associated with a stage associated with an upgrade, data collection, or recommendation action.

4. The method of claim 1 wherein said indicia of said prospect record varies in shape.

5. The method of claim 1 wherein said indicia of said prospect record varies in size.

6. The method of claim 1 wherein at least one of an element, resource, measure or input is associated with said stages.

7. The method of claim 6 wherein at least one of said portions varies in size based on said at least one of an element, resource, measure or input.

8. The method of claim 1 wherein at least one of said portions varies in shape based on said at least one of an element, resource, measure or input.

9. The method of claim 1 further comprising transmitting said updated graphical object to a client terminal.

10. An apparatus for updating a stage of a prospect record, comprising:

a storage device for storing a prospect database; and at least one processing unit, connected to said storage device, said at least one processing unit configured to:

render a graphical object stored as a pre-parsed data structure having at least first and second portions associated with first and second stages, respectively, of a process;

receive a prospect record from said prospect database;

determine that said prospect record is associated with said first stage;

render an indicia for said prospect record on said first portion of said graphical object associated with said first stage;

determine an available action associated with said first stage;

trigger a performance of said available action;

receive results data based on said performance;

associate, based on said results data, said prospect record with said second stage; and render said indicia on said second portion of said graphical object associated with said second stage.

11. The apparatus of claim 10 further comprising a network interface for transmitting said updated graphical object to a client terminal.

12. The apparatus of claim 10 wherein said graphical object is a representation of a tree.

13. The apparatus of claim 12 wherein at least one of said first and second portions associated with said first and second stages is selected from a nutrient around said tree, a bud of said tree and a fruit of said tree, wherein said nutrient is associated with a stage associated with an advertising action, wherein said bud is associated with a stage associated with an upgrade or data collection action, and wherein said fruit is associated with a stage associated with an upgrade, data collection, or recommendation action.

14. The apparatus of claim 10 wherein said indicia of said prospect record varies in shape.

15. The apparatus of claim 10 wherein said indicia of said prospect record varies in size.

16. The apparatus of claim 10 wherein at least one of an element, resource, measure or input is associated with said stages.

17. The apparatus of claim 16 wherein at least one of said portions varies in shape based on said at least one of an element, resource, measure or input.

18. The apparatus of claim 16 wherein at least one of said portions varies in size based on said at least one of an element, resource, measure or input.

* * * * *